(12) United States Patent
Stava

(10) Patent No.: US 6,570,131 B1
(45) Date of Patent: May 27, 2003

(54) ELECTRIC ARC WELDER WITH ARC STARTER

(75) Inventor: Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/050,010

(22) Filed: Jan. 17, 2002

(51) Int. Cl.[7] .................................................. B23K 9/06
(52) U.S. Cl. ............................. 219/130.4; 219/130.33
(58) Field of Search ........................ 219/130.4, 130.33, 219/130.5, 130.51, 137 PS

(56) References Cited

U.S. PATENT DOCUMENTS

| | | | | |
|---|---|---|---|---|
| 4,300,036 A | * | 11/1981 | Johansson | 219/130.33 |
| 4,794,232 A | * | 12/1988 | Kimbrough et al. | 219/130.33 |
| 4,950,864 A | * | 8/1990 | Campiotti et al. | 219/130.4 |
| 5,003,154 A | * | 3/1991 | Parks et al. | 219/137 PS |
| 5,148,001 A | | 9/1992 | Stava | |
| 6,034,350 A | | 3/2000 | Heraly | |

* cited by examiner

Primary Examiner—Clifford C. Shaw
(74) Attorney, Agent, or Firm—Fay, Sharpe, Fagan, Minnich & McKee

(57) ABSTRACT

In a standard electric arc welder of the type having a main power supply with an off condition directing no current across an electrode and a workpiece and an on condition directing welding current between the electrode and the workpiece and through a choke, there is provided a secondary power supply with a switch closable to cause the secondary power supply to apply a given voltage across a series circuit including a high inductance inductor, the electrode and the workpiece. The sensed instantaneous current from the secondary power supply and the voltage between the electrode and the workpiece is multiplied and integrated to create a signal representing accumulated heat between the electrode and the workpiece. A comparator circuit has a first input for the time function signal, a second input for a fixed reference signal and an output for a switching signal when the time function signal equals and/or exceeds said reference signal. The main power supply is turned on when the total heat raises or exceeds a set value as indicated by the switching signal.

54 Claims, 2 Drawing Sheets

ELECTRIC ARC WELDER WITH ARC STARTER

The present invention relates to the art of electric arc welding and more particularly to an electric arc welder having an arc starter and the method of utilizing the arc starter for initiating the welding operation.

INCORPORATION BY REFERENCE

The invention involves an addition to an electric arc welder, such as a MIG welder, to start the welding arc with virtually no spatter. Arc starting techniques are quite common in TIG welding where a non-consumable electrode is employed for creating an arc to melt filler used in the welding process. Starting of a TIG welder is explained in the introductory portion of Heraly U.S. Pat. No. 6,034,350, which is incorporated by reference herein as background technology regarding arc starting, even though the Heraly patent discusses only TIG welding. In this background technology, numerous approaches are explained to start a TIG welding arc. The most popular technique is a high frequency voltage to initiate and maintain the arc between the electrode and workpiece. The high frequency voltage ionizes the gas, thus allowing the welding power to jump the gap between the electrode and workpiece. As explained in this well known background technology, such high frequency starting arrangements have drawbacks. To overcome these drawbacks, TIG welding has used scratch starting where the non-consumable electrode is scratched over the workpiece to create an arc. To overcome the problems associated with such starting, the ground technology discusses a lift arc starting method where a separate low current power circuit creates a small monitored voltage between the electrode and workpiece. When the non-consumable electrode is in engagement with the workpiece, the voltage from the low current power supply warms the electrode. When the electrode is withdrawn, the main power circuit is immediately initiated to provide power between the tungsten electrode and workpiece. However, as described in the background technology, such lift arc starting methods fail to reliably regulate the welding operation. Consequently, Heraly U.S. Pat. No. 6,034,350 is incorporated by reference herein only for its showing of background information associated with TIG welding and starting of the arc for such welding. TIG welding, when using lift starting of the arc, monitors only the voltage and controls the main power supply based upon the voltage. This background technology for the welding assists in understanding the present invention but does not teach the novel concept of this invention allowing it to be especially beneficial for welding with a consumable electrode.

Stava U.S. Pat. No. 5,148,001 discloses an electric arc welder used for STT welding as popularized by The Lincoln Electric Company of Cleveland, Ohio. In this patent there is disclosed a low current high inductance circuit in parallel with the primary power source. The inductance of the secondary circuit is quite high compared to the inductance of the choke in the main welding circuit. In this prior patent, the inductance of the secondary circuit is 0.5 henry compared to the choke having an inductance of 7.0 microhenries. This Stava patent discloses a secondary, high inductance current for maintaining the arc-during STT welding. This patent is incorporated by reference herein for this general technology used in a welding process involving a consumable electrode and short circuit transfer. Stava does not suggest the novel concept of the present invention which does incorporate a separate high inductance power supply, but the parallel current path is used differently.

BACKGROUND OF INVENTION

In electric arc welding, such as MIG, Stick and submerged arc welding, it is desirable to start the arc between the consumable electrode and the workpiece in a manner to reduce spatter. Starting concepts for TIG welding are quite well known as described in the patents incorporated by reference herein; however, these starting concepts are not generally applicable to consumable electrode welding. Such consumable electrode welding still needs to have an efficient start of the arc at the inception of the welding process; however, the TIG welding concepts are generally not applicable and add complexity to the welding equipment. However, the use of a low current high inductance background circuit in parallel with the primary source of current, as suggested in STT welding, presents an advantage when welding with consumable electrodes. Since the loss of a welding arc during the welding process is primarily due to a lack of voltage, such secondary high inductance background current maintains the arc when the voltage from the main power supply is not high enough to maintain the total arc plasma voltage. The total plasma voltage includes the anode and cathode voltage, plus the voltage gradient in the arc itself. In the past, the arc would be extinguished when its arc length exceeded the available voltage from the main power supply. The use of a secondary power supply, such as shown in Stava U.S. Pat. No. 5148,001, allows the welding to maintain the arc even during instantaneous increases in the arc length greater than can be handled by the main power supply. Consequently, when using a parallel high inductance power supply as shown in Stava U.S. Pat. No. 5,148,001, the dynamics of the welding process that often create long arc lengths momentarily need not have a power supply that is large enough to meet the arc requirements during periods of such arc length increases. In other words, the use of a background or parallel source of high inductance power is quite beneficial in welding operations having consumable electrodes. However, heretofore, such parallel high inductance supply of power has not been used for arc starting.

The benefit of using a parallel high inductance power supply for electric arc welding in a consumable type of welding operation is realized because such power supplies generally use a choke in the output circuit. One purpose for this choke is to provide the voltage needed to maintain the arc, as previously described. However, another purpose of the choke is to prevent the output current from changing too rapidly for protecting circuit components from excessive current due to instantaneous load changes. The choke helps stabilize the arc as well as maintain the arc. Consequently, the use of the choke in the welders requires that the choke has a high enough inductance to supply the voltage for long arc lengths to maintain the arc, yet small enough to allow the current to change quickly when required by the welding process. These two requirements of the choke are divergent and conflict with each other. For this reason, the use of a parallel circuit, as shown in Stava U.S. Pat. No. 5,148,001, wherein a second high inductance circuit provides the voltage to maintain the arc at long arc lengths, does not interfere with the ability of the main power supply to quickly alter its current. Of course, if the power supply trends to a low the current below the set current of the high inductance background or secondary power supply, the background current takes over to give a minimum current. All of these advantages obtained by the use of a secondary power supply when used in consumable electrode welding does not relate to improved arc starting which is the subject of the novel aspects of the present invention.

THE INVENTION

The present invention relates to the use of a secondary power supply, as generally taught by Stava U.S. Pat. No.

5,148,001, with additional technology and components to facilitate starting without spatter. The secondary power supply is started with the main power supply off and after the consumable electrode touches the workpiece. This causes low current flow between the consumable electrode and the workpiece. With this low current flow, the electrode is pulled away from the workpiece to create a small arc, especially in the presence of shielding gas. The secondary or background power supply maintains current flow between the electrode and workpiece to cause the electrode and workpiece to be heated. This heating operation is not sufficient to melt the electrode, but does establish a heated vapor between the workpiece and electrode. To assure that enough heat has been applied before the main supply is enabled, the present invention involves the calculation of Joules created between the electrode and workpiece. The total Joules or total heat created at the electrode and workpiece is compared to a set value. Consequently, when the calculated Joules or total heat equals or exceeds a set point, a signal is generated to enable the main power supply. At the same time the wire feeder is started. The welding then proceeds in accordance with standard practice.

An advantage of this method is that the calculated total heat which is compared to a set point heat will compensate for different arc lengths and different shielding gas. In view of the integration feature, voltage spikes are ignored to give a noise free signal. Also, this process is used for arc initiation in semi-automatic or manually welding; however, it is also applicable to robotic automatic welding. The novel arc starting equipment and method is used with an electrode that is steel, stainless steel, steel alloys, aluminum, aluminum alloys, nickel alloys, silicon bronze and other metals. The new arc starting equipment and method is applicable to tubular electrodes, as well as solid wire electrodes. This starting system and method can be used with any welding process using a consumable electrode. However, it is also applicable to non-consumable electrode welding processes, such as TIG welding.

In accordance with an aspect of the invention, the electrode wire feeder is started when the main power supply is started. Consequently, in MIG welding, the novel starter and method of starting the arc turns on the main power supply and also initiates the wire feeder. The novel electric arc welder comprises a main power supply having an off condition directing no current across an electrode and workpiece and an on condition directing welding current between the electrode and workpiece through a choke and a secondary power supply with a switch closable to apply a given current through a series circuit including a high inductance inductor, the electrode and the workpiece. The welder is provided with a sensor to sense the instantaneous current from the secondary power supply and a sensor to sense voltage between the electrode and workpiece. A multiplier circuit has a first input for the instantaneous current and a second input for the voltage and an output constituting the product of the instantaneous current and voltage. This provides a signal having a value representing the watts being created by the secondary power supply. A circuit integrates the watt signal to provide a time function output signal representing the accumulated heat between the electrode and workpiece. A comparator circuit with a first input for the time function signal and a second input for a fixed value reference signal produces an output switching signal when the time function signal equals and/or exceeds the reference signal so the main power supply can be shifted to the on condition when the power supply receives the switching signal from the comparator. To operate the welder, the electrode is touched against the workpiece and the secondary power supply is turned on by closing the switch. Thereafter, the total heat at the electrode and workpiece is accumulated. After a short period of time of less than five seconds, the electrode is pulled away from the workpiece while the total heat is being accumulated. When the total heat reaches a set reference value, the main power supply is turned on. At the same time, when a wire feeder is used for the electrode, the wire feeder is also activated. This provides an arc starting procedure based upon total heat between the electrode and workpiece, as opposed to time and/or voltage as used in prior art.

In accordance with another aspect of the present invention there is provided a method of starting an electric arc welder comprising an electrode movable between a first position touching a workpiece for a given time and a second position pulled away from the workpiece after the given time. The electric arc welder has a main power supply having an off condition directing no current across the electrode and workpiece and an on condition directing welding current between the electrode and workpiece through a choke. A secondary power supply has a switch that is closable to cause the secondary power supply to apply a given current through a series circuit including a high inductance inductor, the electrode and the workpiece. This type secondary background current power supply is similar to the secondary power supply shown in Stava U.S. Pat. No. 5,148,001; however, in the present invention it is preferred that the secondary power supply be powered by a different input source than the main power supply. In addition, the secondary power supply has a switch which allows operation of the secondary power supply separately from the main power supply. This feature is used by the present invention and is not disclosed or suggested by the Stava patent.

In accordance with an aspect of the invention, the wire feeder of the electrode is operated at the same time as the main power supply is activated. In accordance with the invention the given time for the electrode to touch the workpiece is in the general range of less than 5.0 seconds. The low current of the secondary power supply is in the general range of 2–5 amperes. Of course, the inductance of the choke is drastically less than the inductance of the inductor in the secondary power supply circuit. The general ratio of such choke and inductor is the inductance values disclosed in Stava U.S. Pat. No. 5,148,001.

The primary object of the present invention is the provision of a welder with an arc starter, which arc starter can be used for consumable electrodes to provide reduced spatter.

Another object of the present invention is the provision of a welder, as defined above, which welder includes a secondary power supply having a low current, high inductance that prevents arc extinguishing during long arc lengths and also allows arc starting after a predetermined total heat.

Still a further object of the present invention is the provision of an electric arc welder, as defined above, which electric arc welder can be used by a variety of consumable electrode welder with a variety of different consumable electrodes.

Yet another object of the present invention is the provision of an electric arc welder, as defined above, which electric arc welder can also be used for starting an arc in a TIG welder by measuring the total temperature between the electrode and workpiece and applying the main power supply when the total heat reaches a certain value.

Another object of the present invention is the provision of a method of starting an electric arc in an electric arc welder which does not involve merely turning the welder on, but also involves measuring the total heat prior to the welder being turned on.

These and other objects and advantages will become apparent from the following description taken together with the accompanying drawings.

PREFERRED EMBODIMENT

Figure 1:
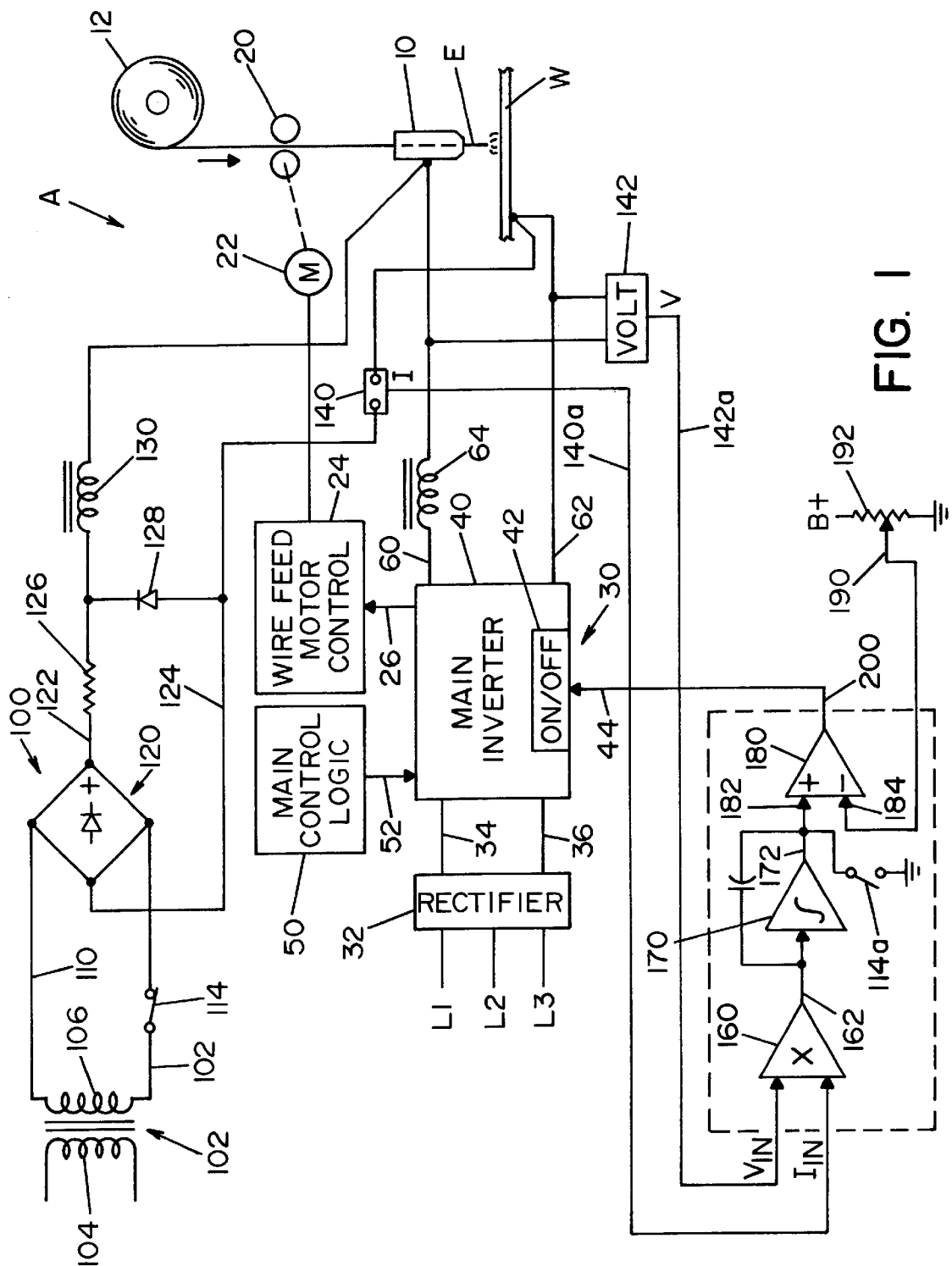
FIG. 1 is a wiring diagram and partial block diagram illustrating the preferred embodiment of the present invention; and, FIG. 2 is a composite time base graph showing in the lower portion the voltage current and accumulated heat during the measuring time and having a superimposed upper graph depicting the position of electrodes with respect to the workpiece at various times along the time graph.

Turning now to the drawings, wherein the showings are for the purpose of illustrating the preferred embodiment of the invention only and not for the purpose of limiting same, FIG. 1 shows welder A that uses electric energy to melt electrode E for deposit of the molten electrode metal onto workpiece W. The welder includes a torch or gun 10 with an internal contact tube through which electrode E, in the form of a wire, is fed from spool or reel 12 by a wire feeder 20 having feed rolls rotated by motor 22 under the control of device 24. This control device receives a command signal on line 26 from the main power supply 30 to determine the wire feed speed of the electrode. During the welding operation, electrode E is driven by feeder 20 toward workpiece W where it is heated and melted by an electric arc produced by current from main power supply 30. Power supply is somewhat standard and includes an input rectifier 32 to create DC current between input leads 34, 36. Inverter 40 has an on/off input network 42 that sets the condition for the inverter or power supply 30 as determined by the logic on line 44. A signal on line 44 turns inverter 40 on and directs welding current, in accordance with the command signal on line 52. The weld current is controlled by the signal on line 52 that is the output of control logic 50. The weld current is provided through leads 60, 62 so that current through choke 44 flows in accordance with the output 52 of control logic 50. As so far described, welder A is a standard electric arc welder for consumable electrodes, such as a welding wire, whether cored-or solid. This same type of welder could be used in stick welding or for submerged arc welding. A current waveform determined by the logic on line 52 from main control logic 50 drives the controller for the main power supply shown as an inverter.

In accordance with the invention, arc welder A includes a secondary power supply 100 designed to provide a fixed low amperage, such as 5 amperes, with an output voltage at a low level, such as about 10 volts. The power supply is separate from the main power supply 30 and includes transformer 102 with a single phase primary winding 104 and a single phase secondary winding 106 for creating an AC voltage across leads 110, 112. A switch 114 which in the preferred embodiment is a trigger on gun or torch 10 when the welder A is used for semi-automatic welding. Upon closing switch 114, alternating current across leads 110, 112 is rectified by rectifier 120 to define a DC voltage across leads 122, 124. Resistor 126 limits the current flow to a high inductance inductor 130 on the output side of flyback diode 128. The secondary power supply is connected to workpiece W by lead 124 and to the electrode E by lead 126. Instantaneous current of the secondary power supply is sensed by shunt 140 to produce an instantaneous current value in line 140a. In a like manner, the voltage of the secondary power supply is sensed by pick up 142 to produce a voltage signal in line 142a. As so far described, when switch 144 is closed, a low current, such as 5 amperes, is directed through high inductance inductor 130 across the electrode E and workpiece W. The instantaneous value of this current is sensed by shunt 140 and the voltage from the secondary power supply is sensed by pick up 142 to produce a signal representative of the voltage in line 142a. Since the main power supply is not on, the wire feeder 120 is not operating and the main power supply does not produce welding current across leads 60, 62.

Figure 2:
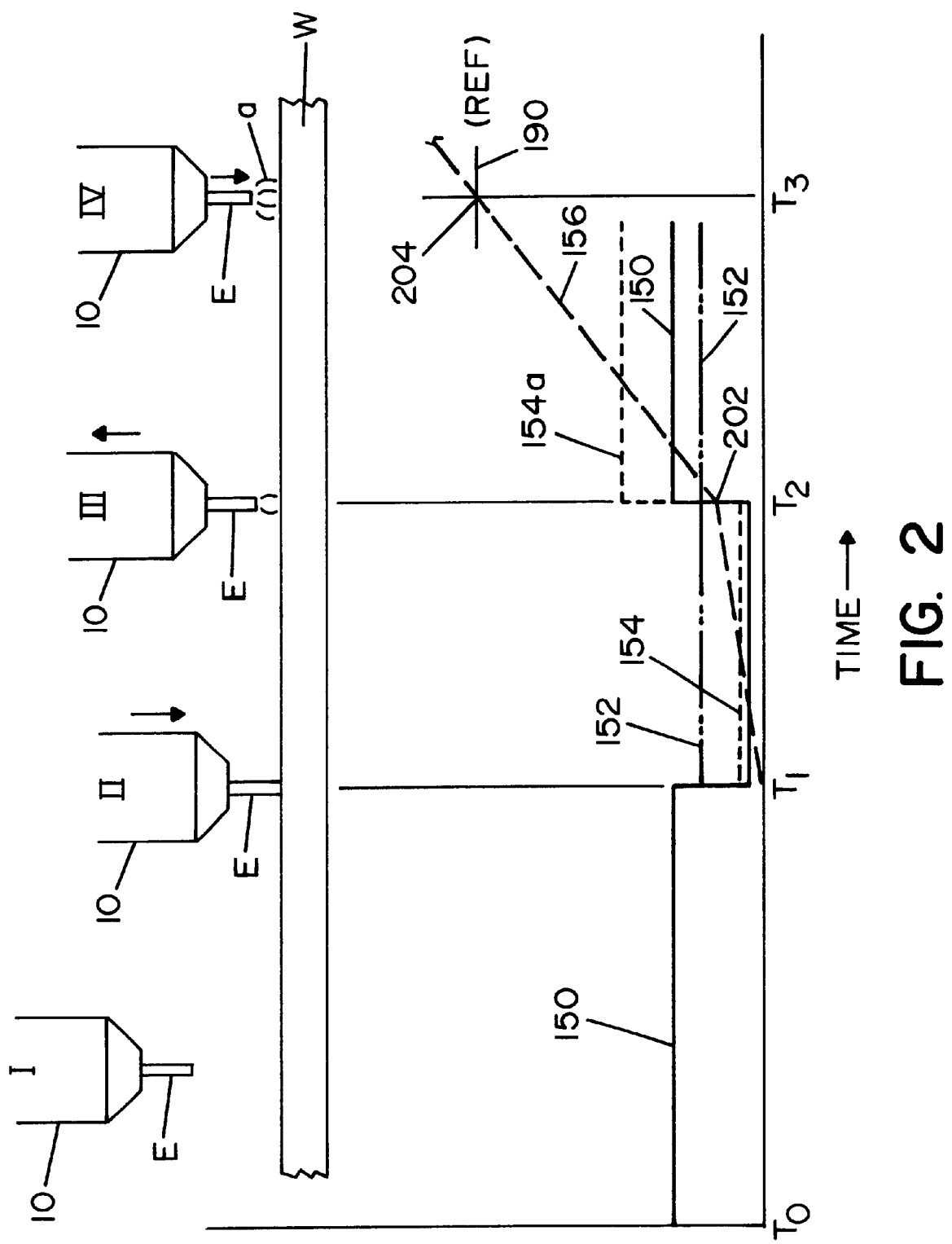

Referring now to the representation in FIG. 2, the current and voltage of the secondary power supply is turned on at time To by closing switch 114. At that time, electrode E is not touching workpiece W as shown in the left hand of the upper schematic diagram and labeled position I. When the switch is closed the current available is 5 amperes and the voltage is 10 volts in this example. Of course, the amperes are not flowing while the electrode is in the position I. The voltage for the secondary power supply is shown in solid line 150. The current, which is regulated at 5 amperes, is shown by line 152 which is a dashed line with two intermediate dashes which start at position H.

At time $T_1$ electrode E is moved down to touch workpiece W. The voltage 150 immediately plunges, as shown in the lower portion of FIG. 2. The current is maintained at the low level represented by line 152. At time $T_1$ the multiplying circuit 160 in FIG. 1 multiplies the instantaneous current on line 140a with the instantaneous voltage on line 142a. This produces a product on line 162 which is the instantaneous wattage of the secondary power supply, shown as dashed line 154 in FIG. 2. As long as the electrode touches workpiece W the line 154 is a straight line and is the product of the low voltage and the instantaneous current. At time $T_2$ gun 10 is pulled from the workpiece touching position II to the-withdrawn or non touching position III. At this instant, voltage 150 shifts back to the output voltage of the secondary power supply. The line 154 is output 162 of multiplexer 160. The value on this line raises to a high level 154a indicated to be 50 watts. When the electrode is touching the workpiece to give a shorted voltage, this lower voltage is multiplied by output low current. Consequently, the watts are at a relatively low level on line 154. As the electrode is pulled away, the voltage immediately shifts upwardly at time $T_2$ and the wattage caused by the secondary power supply increases drastically to the level of line 154a.

As shown in FIG. 1, the wattage level at line 162 is integrated by integration circuit 170 having an output 172 which is shown as dashed line 156 in FIG. 2. This line is essentially a time function for the wattage and provides a signal representing total heat between the electrode and workpiece. This total heat in Joules rises slowly between times $T_1$ and $T_2$ while the electrode is in the touching position II. When in the raised or pulled away position III, line 156 rises rapidly because of the high wattage for an increased time. This gives a time function to accumulate the total heat along line 156. This total heat time function is applied to comparator circuit 180 at input 182. The other input 184 is a fixed voltage set by reference input 190 from rheostat 192. When the total heat in Joules reaches the reference level 190, a switching signal appears in line 200. This signal produces a logic 1 on line 44 to shift the input network 42 to the on condition. This then turns on main power supply 30 at time $T_3$ shown in FIG. 2. Thereafter, welder A performs the welding operation with arc a as shown with the torch or gun 10 in position IV at time $T_3$. This welder touch may be a robotically operated torch with the starting cycle controlled by the on-board computer.

Operation of the present invention is shown in FIG. 2 where the electrode E touches the workpiece at time $T_1$. By this time the switch 114 is closed. Thus, the distance between time $T_1$ and time $T_1$ may be extremely short, if it exists at all. With the switch closed and the electrode against workpiece W, voltage plunges and the instantaneous current remains the same as the electrode is held against the workpiece. At time $T_2$ the workpiece is withdrawn. By this time labeled 202 there is a minor amount of heat due to current flow while electrode E is in position II. With the electrode withdrawn, shown as position III, the total heat accumulates rapidly along the line 156 to point 204 at time $T_3$. The duration between time $T_1$ to time $T_3$ can be referred to as the measure time or the measuring time. The main power supply takes over and performs a welding operation at time $T_3$. However, switch 1 14 remains closed so the secondary voltage is available to assure a sustained arc during the welding operation. After the welding operation, the voltage on line 172 is removed by closing switch 114. Other arrangements could be used for accumulating the total heat energy then turning on the secondary power supply. When the total energy reaches a fixed reference value 190 the welding operation is started. The invention is shown for illustrative purposes as hard logic blocks; however, in practice the calculations and process implementations can be by microprocess software.

The invention involves touching the electrode to the workpiece, turning on an auxiliary high inductance parallel power supply and then turning on the main power supply when the accumulated heat at the intersection of the electrode and workpiece reaches a preset amount. This is not a voltage responsive, nor a time responsive starting operation and is therefore applicable to consumable electrodes without the glitches and inconsistencies caused by other types of starting techniques.

Having thus defined the invention, the following is claimed:

1. An electric arc welder comprising a main power supply having an off condition directing no current across an electrode and a workpiece and an on condition directing welding current between said electrode and said workpiece and through a choke, a secondary power supply with a switch closable to cause said secondary power supply to apply a given current through a series circuit including a high inductance inductor, said electrode and said workpiece, a sensor to sense the instantaneous current from said secondary power supply, a sensor to sense the voltage between said electrode and said workpiece, a multiplier circuit having a first input for said instantaneous current and a second input for said voltage and an output constituting the product of said instantaneous current and said voltage, an integration circuit having said product as an input and a time function output signal representing accumulated heat between said electrode and said workpiece, a comparator circuit with a first input for said time function signal and a second input for a fixed reference signal and an output having a switching signal when said time function signal equals and/or exceeds said reference signal and-an input network on said main power supply for shifting said main power supply on when said network receives said switching signal.

2. An electric arc welder as defined in claim 1 wherein said secondary power supply is separate from said main power supply.

3. An electric arc welder as defined in claim 2 wherein said choke has an inductance less than the inductance of said inductor.

4. An electric arc welder as defined in claim 3 wherein a given current is in the range of 2–5 amperes.

5. An electric arc welder as defined in claim 2 wherein a given current is in the range of 2–5 amperes.

6. An electric arc welder as defined in claim 2 including a torch through which said electrode is fed by a feeder.

7. An electric arc welder as defined in claim 6 wherein said feeder has a motor activated upon creation of said switching signal.

8. An electric arc welder as defined in claim 2 wherein said torch has a trigger to manually close said switch of said secondary power supply.

9. An electric arc welder as defined in claim 2 wherein said electrode is non-consumable.

10. An electric arc welder as defined in claim 1 wherein said choke has an inductance less than the inductance of said inductor.

11. An electric arc welder as defined in claim 10 wherein a given current is in the range of 2–5 amperes.

12. An electric arc welder as defined in claim 10 including a torch through which said electrode is fed by a feeder.

13. An electric arc welder as defined in claim 12 wherein said feeder has a motor activated upon creation of said switching signal.

14. An electric arc welder as defined in claim 10 wherein said torch has a trigger to manually close said switch of said secondary power supply.

15. An electric arc welder as defined in claim 10 wherein said electrode is non-consumable.

16. An electric arc welder as defined in claim 1 wherein a given current is in the range of 2–5 amperes.

17. An electric arc welder as defined in claim 16 including a manually operated torch through which said electrode is fed by a feeder.

18. An electric arc welder as defined in claim 17 wherein said feeder has a motor activated upon creation of said switching signal.

19. An electric arc welder as defined in claim 16 wherein said electrode is non-consumable.

20. An electric arc welder as defined in claim 1 including a torch through which said electrode is fed by a feeder.

21. An electric arc welder as defined in claim 20 wherein said feeder has a motor activated upon creation of said switching signal.

22. An electric arc welder as defined in claim 20 wherein said torch has a trigger to manually close said switch of said secondary power supply.

23. An electric arc welder as defined in claim 1 wherein said torch has a trigger to manually close said switch of said secondary power supply.

24. An electric arc welder as defined in claim 1 wherein said electrode is non-consumable.

25. A method of starting an electric arc welder comprising an electrode movable between a first position touching a workpiece for a given time and second position pulled away from said workpiece after said given time, said arc welder has a main power supply having an off condition directing no current across an electrode and a workpiece and an on condition directing welding current between said electrode and said workpiece and through a choke and a secondary power supply with a switch closable to cause said secondary power supply to apply a given current through a series circuit including a high inductance inductor, said electrode and said workpiece, said method comprising:

(a) closing said switch when said electrode touches said workpiece;

(b) sensing the instantaneous current from said secondary power supply for measure time greater than said given time;

(c) sensing the voltage between said electrode and workpiece during said measure time;

(d) multiplying said instantaneous current and said voltage to obtain a product of said instantaneous current and said voltage during said measure time;

(e) integrating said product to accumulate the total heat between said electrode and said workpiece during said measure time;

(f) comparing said total heat with a fixed reference signal to create a switching signal when said total heat equals and/or exceeds said reference signal; and, (g) shifting said main power supply on when said switching signal is created to start welding by said welder.

26. A method as defined in claim 25 wherein said secondary power supply is separate from said main power supply.

27. A method as defined in claim 26 wherein said given time is less than about 5.0 seconds.

28. A method as defined in claim 25 wherein said choke has an inductance less than the inductance of said inductor.

29. A method as defined in claim 28 wherein said given time is less than about 5.0 seconds.

30. A method as defined in claim 28 including terminating said measure time upon creation of said switching signal.

31. A method as defined in claim 25 wherein said given current is in the range of 2–5 amperes.

32. A method as defined in claim 31 wherein said given time is less than about 5.0 seconds.

33. A method as defined in claim 31 including terminating said measure time upon creation of said switching signal.

34. A method as defined in claim 25 wherein said given time is less than about 5.0 seconds.

35. A method as defined in claim 34 including terminating said measure time upon creation of said switching signal.

36. A method as defined in claim 25 including terminating said measure time upon creation of said switching signal.

37. An electric arc welder comprising a main power supply having an off condition directing no current across an electrode and a workpiece and an on condition directing welding current between said electrode and said workpiece and through a choke, a secondary power supply with a switch closable to cause said secondary power supply to apply a given current through a series circuit including a high inductance inductor, said electrode and said workpiece, a sensor to sense the instantaneous current from said secondary power supply, a sensor to sense the voltage between said electrode and said workpiece, a circuit having a first input for said instantaneous current and a second input for said voltage and an output signal combining said instantaneous current and said voltage, a circuit to convert said output signal into a heat signal representing accumulated heat between said electrode and said workpiece, a comparator circuit with a first input for said heat signal and a second input for a fixed reference signal and an output having a switching signal when said heat signal equals and/or exceeds said reference signal and an input network on said main power supply for shifting said main power supply on for welding when said network receives said switching signal.

38. An electric arc welder as defined in claim 37 wherein said secondary power supply is separate from said main power supply.

39. An electric arc welder as defined in claim 38 wherein a given current is in the range of 2–5 amperes.

40. An electric arc welder as defined in claim 37 wherein said choke has an inductance less than the inductance of said inductor.

41. An electric arc welder as defined in claim 40 wherein a given current is in the range of 2–5 amperes.

42. An electric arc welder as defined in claim 37 wherein said choke has an inductance less than the inductance of said inductor.

43. An electric arc welder as defined in claim 42 wherein a given current is in the range of 2–5 amperes.

44. An electric arc welder as defined in claim 37 wherein a given current is in the range of 2–5 amperes.

45. An electric arc welder as defined in claim 37 including a torch through which said electrode is fed by a feeder.

46. An electric arc welder as defined in claim 45 wherein said feeder has a motor activated upon creation of said switching signal.

47. A method of starting an electric arc welder comprising an electrode movable between a first position touching a workpiece for a given time and second position pulled away from said workpiece after said given time, said arc welder has a main power supply having an off condition directing no current across an electrode and a workpiece and an on condition directing welding current between said electrode and said workpiece and through a choke and a secondary power supply with a switch closable to cause said secondary power supply to apply a given current through a series circuit including a high inductance inductor, said electrode and said workpiece, said method comprising:

(a) closing said switch when said electrode is touching said workpiece;

(b) sensing the instantaneous current from said secondary power supply for measuring time greater than said given time;

(c) sensing the voltage between said electrode and workpiece during said measuring time;

(d) creating a signal representative of the product of said instantaneous current and said voltage during said measuring time;

(e) combining said product with time to create a signal representing the total heat between said electrode and said workpiece accumulated during said measuring time;

(f) comparing said total heat with a fixed reference signal to create a switching signal when said total heat equals and/or exceeds said reference signal; and, (g) shifting said main power supply on when said switching signal is created to start welding by said welder.

48. A method as defined in claim 47 wherein said secondary power supply is separate from said main power supply.

49. A method as defined in claim 48 wherein said given time is less than about 5.0 seconds.

50. A method as defined in claim 47 wherein said choke has an inductance less than the inductance of said inductor.

51. A method as defined in claim 50 wherein said given time is less than about 5.0 seconds.

52. A method as defined in claim 47 wherein said given current is in the range of 2–5 amperes.

53. A method as defined in claim 52 wherein said given time is less than about 5.0 seconds.

54. A method as defined in claim 47 wherein said given time is less than about 5.0 seconds.

* * * * *